US012695307B2

(12) United States Patent
Cao et al.

(10) Patent No.: US 12,695,307 B2
(45) Date of Patent: Jul. 28, 2026

(54) MODEL PREDICTION-BASED CONTROL METHOD FOR GRID FORMING OF MULTI-PORT AUTONOMOUS RECONFIGURABLE SOLAR PLANTS

(71) Applicants:HUANGNENG JIANGSU COMPREHENSIVE ENERGY SERVICE CO., LTD., Nanjing City (CN); Tianjin University, Tianjin (CN)

(72) Inventors: Kenan Cao, Nanjing City (CN); Lei Cui, Nanjing City (CN); Jiebei Zhu, Nanjing City (CN); Chenhui Niu, Nanjing City (CN); Feng Li, Nanjing City (CN); Jie Zhu, Nanjing City (CN); Jiahao Shi, Nanjing City (CN); Dan Wei, Nanjing City (CN); Ke Zhang, Nanjing City (CN); Xiaoyu Zhou, Nanjing City (CN); Jiaping Qian, Nanjing City (CN); Xueke Zhu, Nanjing City (CN); Xiaoyi Liu, Nanjing City (CN)

( * ) Notice: Subject to any disclaimer, the term of this patent is extended or adjusted under 35 U.S.C. 154(b) by 293 days.

(21) Appl. No.: 18/502,907

(22) Filed: Nov. 6, 2023

(65) Prior Publication Data

US 2025/0079837 A1    Mar. 6, 2025

(30) Foreign Application Priority Data

Aug. 29, 2023    (CN) ......................... 202311092293.6

(51) Int. Cl.
*H02J 3/00* (2026.01)
*H02J 3/38* (2026.01)
(Continued)

(52) U.S. Cl.
CPC .............. *H02J 3/004* (2020.01); *H02J 3/381* (2013.01); *H02J 2101/24* (2026.01); *H02J 2103/30* (2026.01); *H02J 2103/35* (2026.01)

(58) Field of Classification Search
CPC ........ H02J 3/004; H02J 3/381; H02J 2101/24; H02J 2103/35; H02J 2103/30
(Continued)

(56) References Cited

U.S. PATENT DOCUMENTS

2014/0316598 A1* 10/2014 Yang ........................ H02J 3/003
                                                    700/295
2019/0148977 A1*  5/2019 Kuroda ..................... H02J 3/16
                                                    700/286
(Continued)

OTHER PUBLICATIONS

Debnath, Suman, et al. "Renewable integration in hybrid AC/DC systems using a multi-port autonomous reconfigurable solar power plant (MARS)." IEEE Transactions on Power Systems 36.1 (2020): 603-612. (Year: 2020).*

*Primary Examiner* — Mohammad Ali
*Assistant Examiner* — Joshua T Sanders

(57) ABSTRACT

A model prediction-based control method for grid forming of multi-port autonomous reconfigurable solar plants includes: estimating and predicting system parameters by establishing a multi-port autonomous reconfigurable solar plant and a dynamic model of a synchronous generator model; converting an objective function into an unconstrained optimization problem, using Newton's method to achieve minimum computational burden within each calculation time step to find a solution in real time for obtaining an optimal angular frequency; based on results of the optimal angular frequency, updating an output voltage and a dq-axis current of the multi-port autonomous reconfigurable solar plant, and changing an arm modulation index of the plant, thereby realizing the plant's inertia and primary
(Continued)

frequency modulation support. The model prediction-based control method provided by the present invention achieves rapid prediction during operation and improves frequency response, rapidity and system stability.

9 Claims, 7 Drawing Sheets

(51) Int. Cl.
    *H02J 101/24*         (2026.01)
    *H02J 103/30*         (2026.01)
    *H02J 103/35*         (2026.01)
(58) Field of Classification Search
    USPC .......................................................... 700/291
    See application file for complete search history.

(56)                References Cited

U.S. PATENT DOCUMENTS

2022/0255503 A1*   8/2022   Marti ..................... H02M 3/155
2023/0010298 A1*   1/2023   Schweizer ................ H02J 3/24

* cited by examiner estimating and predicting system parameters by establishing a multi-port autonomous reconfigurable solar plant and a dynamic model of a synchronous generator model converting an objective function into an unconstrained optimization problem, using Newton's method to achieve minimum computational burden within each calculation time step to find a solution in real time for obtaining an optimal angular frequency updating, based on results of the optimal angular frequency, an output voltage and a dq-axis current of the multi-port autonomous reconfigurable solar plant, and changing an arm modulation index of the plant, thereby realizing the plant's inertia and primary frequency modulation support

FIG. 1

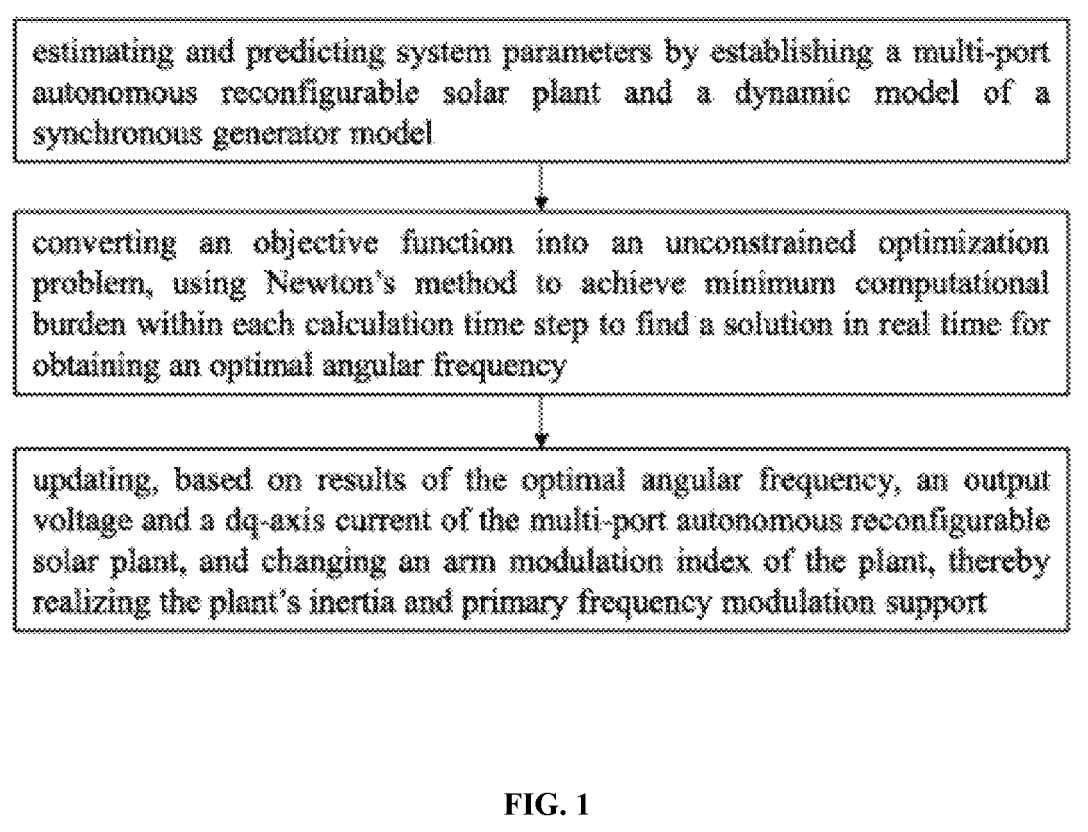

MODEL PREDICTION-BASED CONTROL METHOD FOR GRID FORMING OF MULTI-PORT AUTONOMOUS RECONFIGURABLE SOLAR PLANTS

TECHNICAL FIELD

The invention relates to the technical field of active support of photovoltaic systems for power grid failures, in particular to a model prediction-based control method for grid forming of multi-port autonomous reconfigurable solar plants.

BACKGROUND

With the large-scale integration of solar photovoltaics, the inertia of the power grid gradually decreases under the traditional control mode, such that, after a disturbance event occurs, the frequency is likely to drop rapidly, triggering the action of the low-frequency load shedding device and causing a major power outage. Multi-port autonomous reconfigurable solar plants (MARS), developed through the integration of photovoltaic and energy storage systems, can provide strong support capabilities during AC grid disturbances. However, most MARS systems adopt a grid following control algorithm, so applying this control algorithm to low short-circuit ratio and low inertia systems may bring new control and stability challenges.

Grid forming control can instantaneously adjust the terminal voltage without the phase-locked loop, and it can be mainly divided into the following two categories: (1) control based on synchronous generators; (2) droop control. The first approach is developed based on a strategy that simulates the inherent characteristics of a conventional synchronous generator. The second approach utilizes traditional frequency droop and voltage droop characteristics to regulate active and reactive power. Compared to the grid following control, the grid forming control can actively establish system frequency, respond faster in case of faults, and better ensure system stability after large-scale integration of new energy into the power system.

A grid-connected control algorithm based on Model-Based Predictive Control (MBPC) is proposed for micro-grids, multi-terminal DC transmission systems, and power system test benches. However, in these studies, the MBPC algorithm may be used solely to improve voltage control and is not used to improve frequency response; or it calculates additional power set points during disturbances and sends them to the power external control loop to achieve frequency response, but it does not directly change the system angular frequency. Furthermore, a finite set model predictive control (FS-MPC) is proposed to improve the voltage control. However, these methods may impose a high computational burden when implemented in real-time to solve optimization problems.

Therefore, a new grid forming control scheme is urgently needed to realize the MARS system's support with respect to the grid frequency.

SUMMARY OF INVENTION

The purpose of this section is to outline some aspects of embodiments of the present invention and to briefly introduce some preferred embodiments. Some simplifications or omissions may be made in this section, in the abstract, and in the invention title of the present disclosure to avoid obscuring the purpose of this section, the abstract, and the invention title, and such simplifications or omissions cannot be used to limit the scope of the invention.

In view of the above existing problems, the present invention is proposed.

Therefore, the technical problem solved by the present invention is: when the power grid fails, the existing multi-port autonomous reconfigurable solar plants cannot effectively provide inertia and primary frequency regulation support, and cannot provide how to optimize the control strategy of the system for improving the stability and response speed of the power grid.

In order to solve the above technical problems, the present invention provides the following technical solution: a model prediction-based control method for grid forming of multi-port autonomous reconfigurable solar plants, including:

estimating and predicting system parameters by establishing a multi-port autonomous reconfigurable solar plant and a dynamic model of a synchronous generator model; converting an objective function into an unconstrained optimization problem, using Newton's method to achieve minimum computational burden within each calculation time step to find a solution in real time for obtaining an optimal angular frequency; based on results of the optimal angular frequency, updating an output voltage and a dq-axis current of the multi-port autonomous reconfigurable solar plant, and changing an arm modulation index of the plant, thereby realizing the plant's inertia and primary frequency modulation support.

As a preferred solution of the model prediction-based control method for the grid forming of the multi-port autonomous reconfigurable solar plants of the present invention, it recites: the estimating and predicting the system parameters includes measuring voltage and current data at time [k] of an interconnection point between a MARS system and a transmission grid; according to a dynamic continuous time model of the MARS system, estimating the voltage and current data at time [k+1]; setting $\omega_{sg}$ at time [k+1] to the value of the previous step, and, according to a synchronous generator frequency dynamic model and the voltage and current data at time [k+1], estimating a rotor angle θsg to obtain an electromechanical torque at [k+2] time; establishing quadratic term deviation of the [k+2] electromechanical torque relative to a mechanical torque and an optimization objective function of deviation of a [k+1] angular frequency relative to a reference angular frequency.

As a preferred solution of the model prediction-based control method for the grid forming of the multi-port autonomous reconfigurable solar plants of the present invention, it recites: the MARS system is a three-phase system with each phase composed of two arms, and each arm is composed of a normal module SM, a photovoltaic module PV-SM, an energy storage module ESS-SM, an arm inductor $(L_o)$, and an arm resistance $(R_o)$, in which the numbers of the modules are $N_{norm}$, $N_{pv}$, and $N_{ess}$, respectively.

As a preferred solution of the model prediction-based control method for the grid forming of the multi-port autonomous reconfigurable solar plants of the present invention, the dynamic continuous time model is expressed as, $$\begin{cases} \left(L_s + \frac{L_o}{2}\right)\frac{di_j}{dt} + \left(R_s + \frac{R_o}{2}\right)i_j = e_j - v_j \\ e_i = \frac{-v_{p,j} + v_{n,j}}{2} \end{cases}$$

3

-continued $$T_e[k+2] = M_f i_f[k] (i_a[k+2]\cos(\theta_{sg}[k+2]) +$$

$$i_b[k+2]\cos(\theta_{sg}[k+2]-2\pi/3) + i_c[k+2]\cos(\theta_{sg}[k+2]-4\pi/3))$$

$$e_a[k+1] = \omega_{sg}[k+1] M_f i_f[k]\cos(\theta_{sg}[k+1])$$

$$e_b[k+1] = \omega_{sg}[k+1] M_f i_f[k]\cos(\theta_{sg}[k+1]-2\pi/3)$$

$$e_c[k+1] = \omega_{sg}[k+1] M_f i_f[k]\cos(\theta_{sg}[k+1]-4\pi/3)$$

$$Q[k] = -\omega_{sg}[k] M_f i_f[k] (i_a[k]\sin(\theta_{sg}[k]) +$$

$$i_b[k]\sin(\theta_{sg}[k]-2\pi/3) + i_c[k]\sin(\theta_{sg}[k]-4\pi/3))$$

$$\theta_{sg}[k+2] = \theta_{sg}[k+1] + h\omega_{sg}[k+1]$$

$$\omega_{sg}[k+2] =$$

$$\omega_{sg}[k+1]\left(1 - \frac{hD_p}{J}\right) + \frac{h}{J}(T_m[k+1] - T_e[k+1] - D_p(\omega_n[k+1]))$$

where, $i_j$ and $v_j$ are grid current and voltage of the j-th phase ($j \in$ a, b, c) respectively, $e_j$ represents the output voltage of the j-th phase of the MARS system, $L_o$ and $R_o$ are the arm inductance and arm resistance, respectively, $L_s$, $R_s$ are the grid-side inductance and grid-side resistance, respectively, $M_{fif}$ is the excitation current of the synchronous generator, $T_e$ represents the electromechanical torque, $Os_g$ represents the rotor angle, Q represents the reactive power, $\omega_{sg}$ represents the optimal angular frequency, h represents the integration step, and k represents the current time, $D_p$ represents the damping coefficient, J represents the moment of inertia, and $T_m$ represents the mechanical torque.

As a preferred solution of the model prediction-based control method for the grid forming of the multi-port autonomous reconfigurable solar plants of the present invention, the objective function is expressed as, $$J(x) = J_1(x) + J_2(x)$$

$$x = (\omega_{sg}[k+1])$$

$$J_1(x) = \lambda_1 (T_e[k+2] - T_m[k+2])^2$$

$$J_2(x) = \lambda_2 (\omega_n[k+1] - x)^2$$

where, $\lambda_1$ and $\lambda_2$ represent the weights of the cost functions, and con represents the reference angular frequency.

As a preferred solution of the model prediction-based control method for the grid forming of the multi-port autonomous reconfigurable solar plants of the present invention, it recites: the result of the optimal angular frequency is expressed as, $$\min_x J(x)$$

$$\text{s.t. } T_e[k+2] = M_f i_f[k] (i_a[k+2]\cos(\theta_{sg}[k+2]) +$$

$$i_b[k+2]\cos(\theta_{sg}[k+2]-2\pi/3) + i_c[k+2]\cos(\theta_{sg}[k+2]-4\pi/3))$$

$$e_a[k+1] = \omega_{sg}[k+1] M_f i_f[k]\cos(\theta_{sg}[k+1])$$

$$e_b[k+1] = \omega_{sg}[k+1] M_f i_f[k]\cos(\theta_{sg}[k+1]-2\pi/3)$$

$$e_c[k+1] = \omega_{sg}[k+1] M_f i_f[k]\cos(\theta_{sg}[k+1]-4\pi/3)$$

$$\theta_{sg}[k+2] = \theta_{sg}[k+1] + h\omega_{sg}[k+1]$$

$$T_m[k+2] = \frac{P_{ac,ref}[k+2]}{\omega_n}$$

4 where, $P_{ac,ref}$ represents the AC side power scheduling command.

As a preferred solution of the model prediction-based control method for the grid forming of the multi-port autonomous reconfigurable solar plants of the present invention, it recites: the result for the optimal angular frequency includes substituting the equation terms into J(x), and the objective function J(x) is transformed into an unconstrained optimization problem. The transformed objective function is minimized using Newton's method, and x at each time step is given by calculating (n+1) iterations by using a recursive formula.

The recursive formula is expressed as, $$x^{(n+1)} = x^{(n)} - F(x^{(n)})^{-1} g(x^{(n)})$$

$$g(x^{(n)}) = \left[\frac{\partial J(x^{(n)})}{\partial x}\right]$$

$$F(x^{(n)}) = \left[\frac{\partial g(x^{(n)})}{\partial x}\right]$$

where, $x^{(n+1)}$ is the optimal angular frequency $\omega_{sg}$ after the (n+1)-th iteration, $g(x^{(n)})$ is the derivative of the objective function J(x), and $F(x^{(n)})$ is derivative of function $g(x^{(n)})$.

The realizing the plant's inertia and primary frequency modulation support includes updating the output voltage of the MARS system and the dq-axis current according to the results of the optimal [k+1] angular frequency, changing the arm modulation index of the system, and realizing the plant's inertia and primary frequency modulation support.

Another object of the present invention is to provide a model prediction-based control system for grid forming of multi-port autonomous reconfigurable solar plants, which can solve the problem of the existing technology's inability through accurate system parameter prediction and optimized control strategies. It solves the problem that the existing technology cannot provide timely and accurate response support when power grid faults occur.

In order to solve the above technical problems, the present invention provides the following technical solution: a model prediction-based control system for grid forming of multi-port autonomous reconfigurable solar plants is provided, including: a power grid data acquisition module, a model prediction control module, an optimization-to-objective function module, and an unconstrained optimization solver module, and a control index updated module.

The power grid data acquisition module is used to collect the voltage and current data information of the power grid in real time; the model prediction control module uses the data obtained from the power grid data acquisition module to perform prediction through the dynamic model of the synchronous generator, so as to calculate the voltage, current and rotor angle at the next time; the optimization-to-objective function module is used to establish the optimization objective function for system control, including the difference between motor torque and mechanical torque and the deviation of angular frequency relative to the reference angular frequency; the unconstrained optimization solver module uses the Newton method optimization algorithm, according to the optimization objective function, to convert the optimization problem into an unconstrained optimization problem, and solves the optimal angular frequency; the control index updated module updates the output voltage of the MARS system and the dq-axis current, according to the optimal angular frequency obtained by the unconstrained optimization solver module, and changes the arm modulation index of the system, and realizes the plant's inertia and primary frequency modulation support.

A computer device includes a memory and a processor. The memory stores a computer program, characterized in that when the processor executes the computer program, it implements the steps of the model prediction-based control method for the grid forming of the multi-port autonomous reconfigurable solar plants as afore-described.

A computer-readable storage medium has a computer program stored thereon, characterized in that when the computer program is executed by a processor, the steps of the model prediction-based control method for the grid forming of the multi-port autonomous reconfigurable solar plants as afore-described are implemented.

Beneficial effects of the present invention: the model prediction-based control method for the grid forming of the multi-port autonomous reconfigurable solar plants provided by the present invention directly predicts and controls the angular frequency of the power grid. The convergence degree of the objective function is fast, and rapid prediction can be achieved in actual operation; the MARS system control is realized by simulating the real rotor motion equation of the synchronous machine. There is no need for a phase-locked loop to detect the system frequency, which improves the frequency response, rapidity and system stability; it is suitable for a variety of power grids with different short circuits and inertias, and it can play the role of frequency support when the system is disturbed.

BRIEF DESCRIPTION OF DRAWINGS

In order to explain the technical solutions of the embodiments of the present invention more clearly, the drawings needed to be used in the description for the embodiments will be briefly introduced below. Obviously, the drawings in the following description are only for some embodiments of the present invention. For those of ordinary skill in the art, other drawings can be obtained based on these drawings without exerting any creative effort. There are:

FIG. 1 is an overall flow chart of a model prediction-based control method for grid forming of a multi-port autonomous reconfigurable solar plant provided by an embodiment of the present invention.

DETAILED DESCRIPTION OF THE INVENTION

Figure 2:
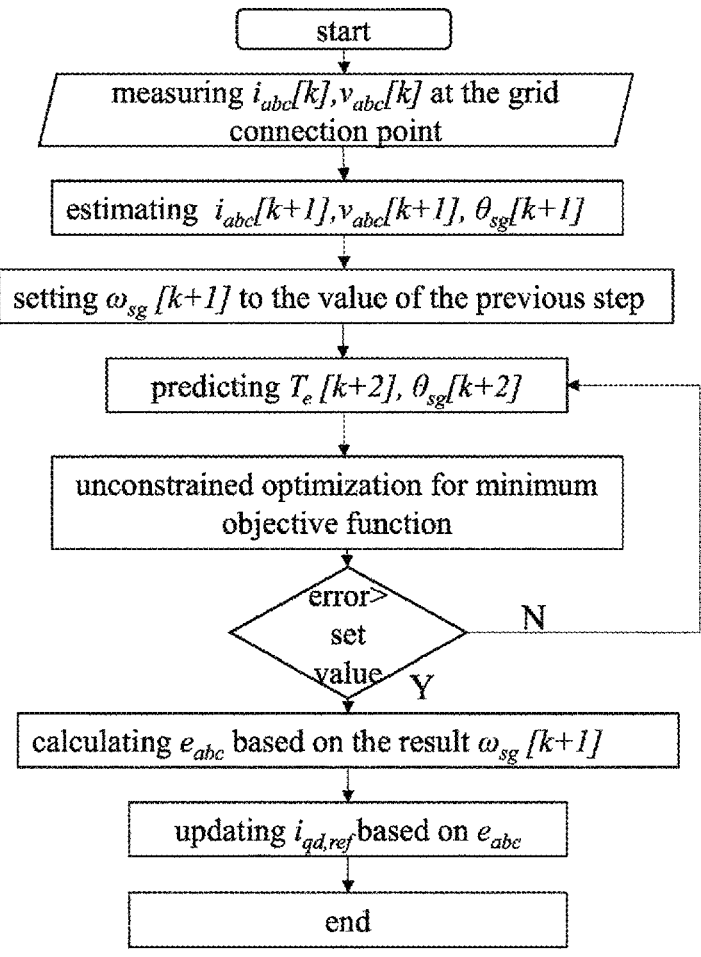
FIG. 2 is another flow chart of a model prediction-based control method for grid forming of a multi-port autonomous reconfigurable solar plant provided by a first embodiment of the present invention.

In order to make the above objects, features and advantages of the present invention more obvious and easy to understand, the specific embodiments of the present invention will be described in detail below with the accompanying drawings. It is obvious that the described embodiments are part of the embodiments of the present invention, not all of them. Based on the embodiments of the present invention, all other embodiments obtained by ordinary people in the art without creative efforts should fall within the protection scope of the present invention.

Many specific details are set forth in the following description to make readers fully understand the present invention. However, the present invention can also be implemented in other ways different from those described here. Those skilled in the art can do so without departing from the connotation of the present invention so similar generalizations can be made, and therefore the present invention is not limited to the specific embodiments disclosed below.

Second, reference herein to "one embodiment" or "an embodiment" refers to a specific feature, structure, or characteristic that may be included in at least one implementation of the present invention. "In one embodiment" appearing in different places in this specification does not all refer to the same embodiment, nor is it a separate or selective embodiment that is mutually exclusive with other embodiments.

The present invention will be described in detail with reference to schematic diagrams.

As describing the embodiments of the present invention in detail, for the convenience of explanation, the cross-sectional view showing the device structure is not enlarged according to the general scale. Moreover, the schematic diagrams are only examples and shall not limit the protection scope of the present invention. In addition, the three-dimensional dimensions of length, width and depth should be included in actual production.

Moreover, in the description of the present invention, it should be noted that the orientation or positional relationship indicated by the terms "upper, lower, inner and outer" are based on the orientation or positional relationship shown in the drawings, and are only for the convenience of describing the present invention. The present invention and simplified description are not intended to indicate or imply that the devices or elements referred to must have a specific orientation, be constructed and operate in a specific orientation, and therefore are not to be construed as limitations of the present invention. Furthermore, the terms "first, second or third" are used for descriptive purposes only and are not to be construed as indicating or implying relative importance.

In the present invention, unless otherwise clearly stated and limited, the terms "installation, connection, and connection" should be understood in a broad sense. For example, it can be a fixed connection, a detachable connection, or an integrated connection; it can also be a mechanical connection, an electrical connection, or a direct connection. Connection can also be indirectly connected through an intermediary, or it can be an internal connection between two components. For those of ordinary skill in the art, the specific meanings of the above terms in the present invention can be understood on a case-by-case basis.

Embodiment 1

Referring to FIG. 1-4, one embodiment of the present invention is shown, providing a model prediction-based control method for grid forming of a multi-port autonomous reconfigurable solar plant, which includes:

providing a model prediction-based control method for grid forming of a multi-port autonomous reconfigurable solar plant, so as to enable a multi-port autonomous reconfigurable solar plant to providing real-time inertia and primary frequency regulation support for various power grids with different short circuits and inertias. The model prediction-based control method mainly include: evaluating and predicting dynamic models for variables; evaluating objective functions for system control objectives; optimization for calculating optimal control variables.

First, system parameters are estimated and predicted by establishing a multi-port autonomous reconfigurable solar plant and a dynamic model of a synchronous generator model; then, an objective function is converted into an unconstrained optimization problem, using Newton's method to achieve minimum computational burden within each calculation time step to find a solution in real time for obtaining an optimal angular frequency; finally, based on results of the optimal angular frequency, an output voltage and a dq-axis current of the multi-port autonomous reconfigurable solar plant are updated, and an arm modulation index of the plant is changed, thereby realizing the plant's inertia and primary frequency modulation support. This method can adapt to a variety of power grids with different short circuits and inertias, enabling the multi-port autonomous reconfigurable solar plant to provide better support in terms of frequency nadir and frequency stability during system frequency excursions.

Step 1: measuring voltage and current data at time [k] of an interconnection point between a MARS system and a transmission grid.

Step 2: according to a dynamic continuous time model of the MARS system, estimating the voltage and current data at time [k+1].

Step 3:setting $\omega_{sg}$ at time [k+1] to the value of the previous step, and, according to a synchronous generator frequency dynamic model and the voltage and current data at time [k+1], estimating a rotor angle θsg to obtain an electromechanical torque at time [k+2];

Step 4: establishing quadratic term deviation of the [k+2] electromechanical torque relative to a mechanical torque and an optimization objective function of deviation of a [k+1] angular frequency relative to a reference angular frequency.

Step 5: converting the objective function into an unconstrained optimization problem and using Newton's method to solve it to obtain the optimal [k+1] angular frequency.

Step 6: updating the output voltage of the MARS system and the dq-axis current according to the results of the optimal [k+1] angular frequency, changing the arm modulation index of the system, and realizing the inertia and primary frequency modulation support of the system.

The MARS system is a three-phase system with each phase composed of two arms, and each arm is composed of a normal module SM, a photovoltaic module PV-SM, an

Figure 3:
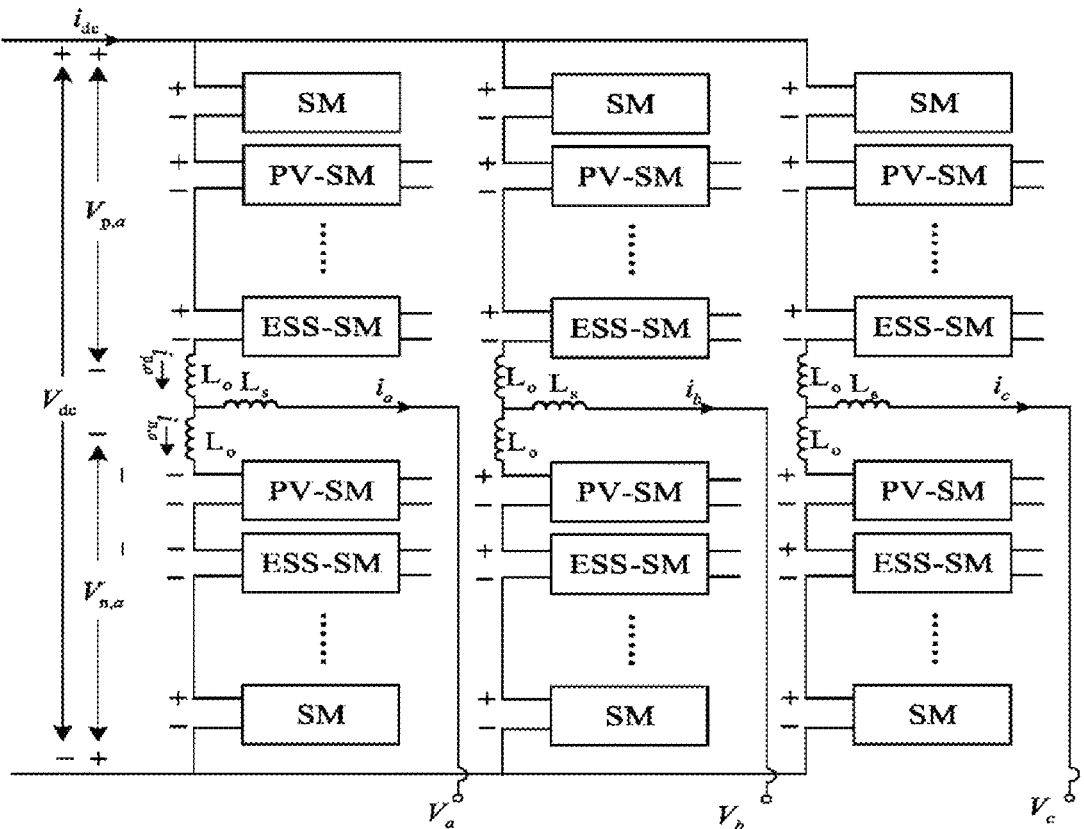
FIG. 3 is an overview diagram of a multi-port autonomous reconfigurable solar plant of a model prediction-based control method for grid forming of a multi-port autonomous reconfigurable solar plant provided by the first embodiment of the present invention.

8 energy storage module ESS-SM, an arm inductor ($L_o$), and an arm resistance ($R_o$), in which the numbers of the modules are $N_{norm}$, $N_{pv}$, and $N_{ess}$, respectively. As shown in FIG. 3, the dynamic continuous time model is expressed as, $$\begin{cases}\left(L_s+\frac{L_o}{2}\right)\frac{di_j}{dt}+\left(R_s+\frac{R_o}{2}\right)i_j=e_j-v_j\\e_i=\frac{-v_{p,j}+v_{n,j}}{2}\end{cases} \tag{1}$$

where, $i_j$ and $v_j$ are grid current and voltage of the j-th phase (j∈ a, b, c) respectively, $e_i$ represents the output voltage of the j-th phase of the MARS system, $L_o$ and $R_o$ are the arm inductance and arm resistance, respectively, $L_s$, $R_s$ are the grid-side inductance and grid-side resistance, respectively.

The grid control mimics the characteristics of a synchronous generator, providing frequency support and voltage support during the grid events with frequency or voltage deviations. According to the mathematical model of the synchronous machine, the discrete time representations of the electromechanical torque ($T_e$) at the time step k+2 time, $e_j$ at the k+1 time, and the reactive power (Q) at the k time is given by the following formulas:

$$T_e[k+2]=M_f i_f[k]\big(i_a[k+2]\cos(\theta_{sg}[k+2])+ \tag{2}$$

$$i_b[k+2]\cos(\theta_{sg}[k+2]-2\pi/3)+i_c[k+2]\cos(\theta_{sg}[k+2]-4\pi/3)\big)$$

$$e_a[k+1]=\omega_{sg}[k+1]M_f i_f[k]\cos(\theta_{sg}[k+1])$$

$$e_b[k+1]=\omega_{sg}[k+1]M_f i_f[k]\cos(\theta_{sg}[k+1]-2\pi/3)$$

$$e_c[k+1]=\omega_{sg}[k+1]M_f i_f[k]\cos(\theta_{sg}[k+1]-4\pi/3)$$

$$Q[k]=-\omega_{sg}[k]M_f i_f[k]\big(i_a[k]\sin(\theta_{sg}[k])+$$

$$i_b[k]\sin(\theta_{sg}[k]-2\pi/3)+i_c[k]\sin(\theta_{sg}[k]-4\pi/3)\big)$$

where, $M_{fif}$ is the excitation current of the synchronous generator, $T_e$ represents the electromechanical torque, $\theta_{sg}$ represents the rotor angle, Q represents the reactive power, $\omega_{sg}$ represents the optimal angular frequency.

The calculation formula of the rotor angle ($\theta_{sg}$) is:

$$\theta_{sg}[k+2]=\theta_{sg}[k+1]+h\omega_{sg}[k+1] \tag{3}$$

where, h represents the integration step, and k represents the current time.

The discrete time model of the system frequency dynamics is expressed as:

$$\omega_{sg}[k+2]= \tag{1}$$

$$\omega_{sg}[k+1]\left(1-\frac{hD_p}{J}\right)+\frac{h}{J}(T_m[k+1]-T_e[k+1]-D_p(\omega_n[k+1]))$$

where, $D_p$ represents the damping coefficient, J represents the moment of inertia, and $T_m$ represents the mechanical torque.

The control objective of MBPC-based frequency control is to generate optimal $\omega_{sg}$ by solving an objective function using an optimization method. The objective function is expressed as, $$J(x) = J_1(x) + J_2(x) \qquad (5)$$

$$x = (\omega_{sg}[k+1])$$

$$J_1(x) = \lambda_1 (T_e[k+2] - T_m[k+2])^2$$

$$J_2(x) = \lambda_2 (\omega_n[k+1] - x)^2$$

where, $\lambda_1$ and $\lambda_2$ represent the weights of the cost functions, and $\omega_n$ represents the reference angular frequency.

The two main goals of the objective function in equation (5) are: (a) to track $\omega_{sg}$ with respect to the reference angular frequency $\omega_n$; (b) to generate the optimal electromechanical torque $T_e$ based on the deviation observed in $\omega_{sg}$. The first objective is achieved by minimizing the quadratic error between $\omega_n$ and $\omega_{sg}$, defined by $J_2(x)$. The second objective is achieved by minimizing the quadratic error between $T_e$ and $T_m$, defined by $J_1(x)$.

Torque control: the quadratic cost function definition of torque control is given by $J_1(x)$. $T_e$ is calculated using (2) and is predicted at time [k+2]. The electrical torque $T_e$ is controlled to regulate the active power in the system during frequency excursions. Whenever the electrical load on the system increases or decreases (equivalent to a decrease or increase in generation), the system frequency will decrease or increase. In this case, $T_e$ increases or decreases as the system frequency changes. To compensate for the increased or decreased $T_e$, the angular frequency of the MARS system terminals needs to be changed.

Angular frequency control: the quadratic cost function of angular frequency control is given by $J_2(x)$. The goal is to reduce the variation of $\omega$sg relative to on while keeping $T_e$ close to $T_m$. The frequency $\omega_{sg}$ at time [k+1] is optimized based on $(T_e - T_m)$ at time [k+2].

The objective function formula defined in (5) is given by:

$$\min_x J(x) \qquad (6)$$

$$\text{s.t. } T_e[k+2] = M_f i_f[k](i_a[k+2]\cos(\theta_{sg}[k+2]) +$$

$$i_b[k+2]\cos(\theta_{sg}[k+2] - 2\pi/3) + i_c[k+2]\cos(\theta_{sg}[k+2] - 4\pi/3))$$

$$e_a[k+1] = \omega_{sg}[k+1]M_f i_f[k]\cos(\theta_{sg}[k+1])$$

$$e_b[k+1] = \omega_{sg}[k+1]M_f i_f[k]\cos(\theta_{sg}[k+1] - 2\pi/3)$$

$$e_c[k+1] = \omega_{sg}[k+1]M_f i_f[k]\cos(\theta_{sg}[k+1] - 4\pi/3)$$

$$\theta_{sg}[k+2] = \theta_{sg}[k+1] + h\omega_{sg}[k+1]$$

$$T_m[k+2] = \frac{P_{ac,ref}[k+2]}{\omega_n}$$

where, $P_{ac,ref}$ represents the AC side power scheduling command.

By substituting the equation terms in (6) into J(x), the objective function J(x) is transformed into an unconstrained optimization problem. Thereafter, the transformed objective function is minimized using Newton's method, and x at each time step is given by calculating (n+1) iterations by using the following recursive formula:

$$x^{(n+1)} = x^{(n)} - F(x^{(n)})^{-1} g(x^{(n)}) \qquad (2)$$

$$F(x^{(n)}) = \left[\frac{\partial g(x^{(n)})}{\partial x}\right]; g(x^{(n)}) = \left[\frac{\partial J(x^{(n)})}{\partial x}\right]$$

where, $x^{(n+1)}$ is the optimal angular frequency $\omega_{sg}$ after the (n+1)-th iteration, $g(x^{(n)})$ is the derivative of the objective function J(x), and $F(x^{(n)})$ is derivative of function $g(x^{(n)})$.

$i_j$ and $v_j$ measured at the connection point between the MARS system and the transmission grid are obtained. Once $i_j$ is measured at [k] time, the dynamic model in (1) is used for estimating $i_j$ at [k+1] time. Since the change speed of $v_j$ is slower compared with MARS system dynamics, in this process, it is assumed that $v_j$ at the [k+1]-th time is equal to $v_j$ at the [k]-th time. $\theta_{sg}$ and $e_j$ at the [k+1]-th time are estimated according to equations (3) and (2), respectively. The estimated values of $i_j$, $v_j$ and $e_j$ at [k+1] time are used to predict $i_j$ at [k+2]-th time using (1). Then, $T_e$ at the [k+2]-th time is predicted using (2) by substituting $i_j$ at the [k+2]-th time. The predicted state is contained in the objective function J(x), which is then minimized using unconstrained optimization to obtain the optimal value x. When $T_e$ is predicted at the [k+2]-th time, the initial setting value of $\omega_{sg}$ at the [k+1]-th time is $\omega_{sg}$ at the [k]-th time. Based on the optimal value x, the reference current ($i_{qd,ref}$) of the $e_j$ and $d_q$ axes get updated. $i_{gd,ref}$ is used to decouple the current controller to determine the arm modulation index $m_{abc}$ of the MARS system, so as to achieve the inertia and primary frequency modulation support of the system.

In FIG. 3, $L_o$ is the arm inductance, $R_o$ is the arm resistance, SM is the normal module, PV-SM is the photovoltaic module, ESS-SM is the energy storage module, $i_a$, $i_b$, $i_c$ and $v_a$, $v_b$, $v_c$ are the three phase currents and voltages of the bridge arm, respectively, and vdc is the DC voltage.

Figure 4:
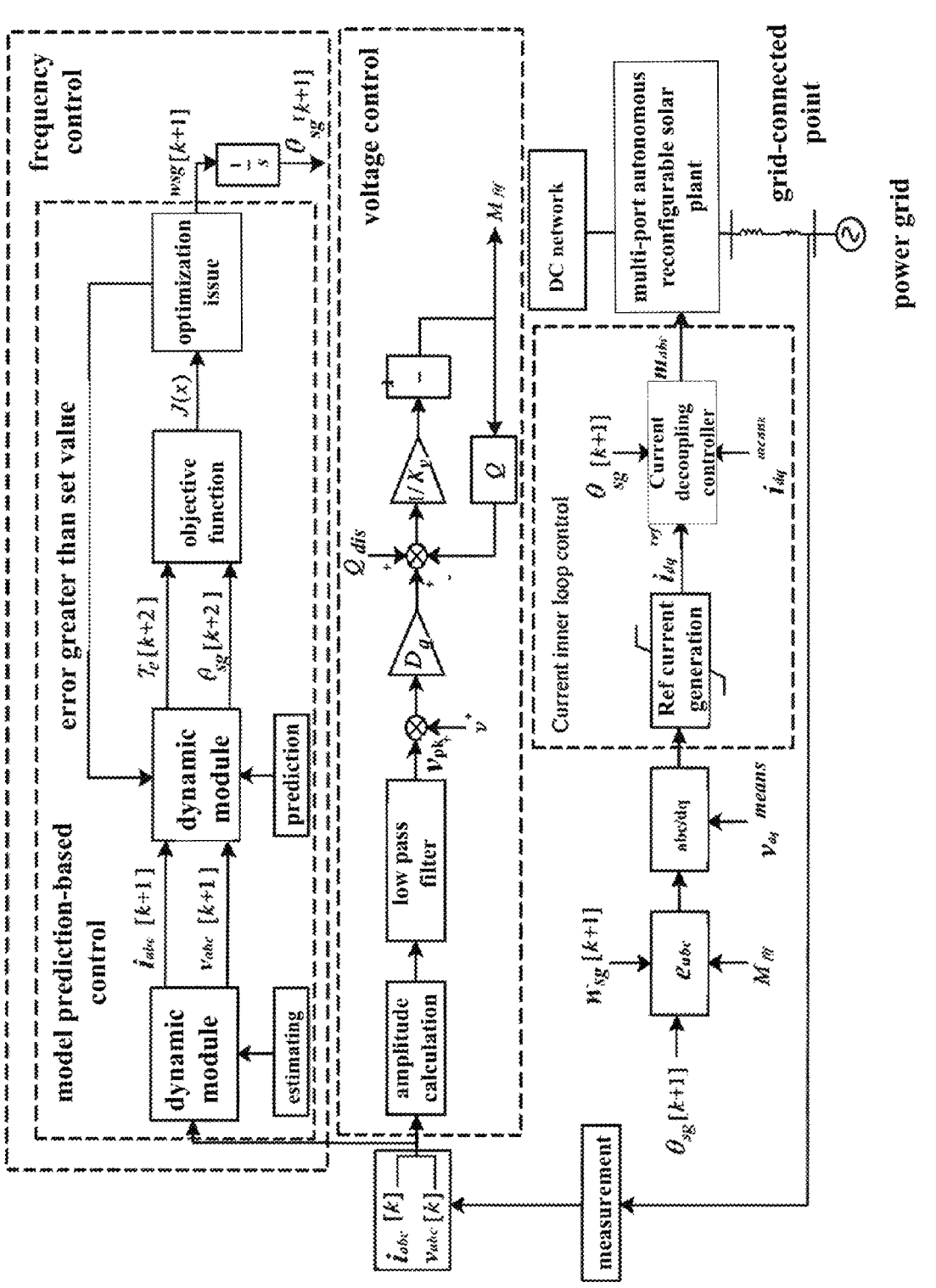
FIG. 4 is a control schematic diagram of a model prediction-based control method for grid forming of a multi-port autonomous reconfigurable solar plant which is based on a multi-port autonomous reconfigurable solar plant of model prediction.

In FIG. 4, $\beta_{ref,min}$,max ($v_{Wind}$,load) $\omega_{sg}$ is the optimal angular frequency, on is the reference angular frequency, J(x) is the objective function, $T_e$ is the electromechanical torque, and $T_m$ is the mechanical torque.

Embodiment 2

Figure 5:
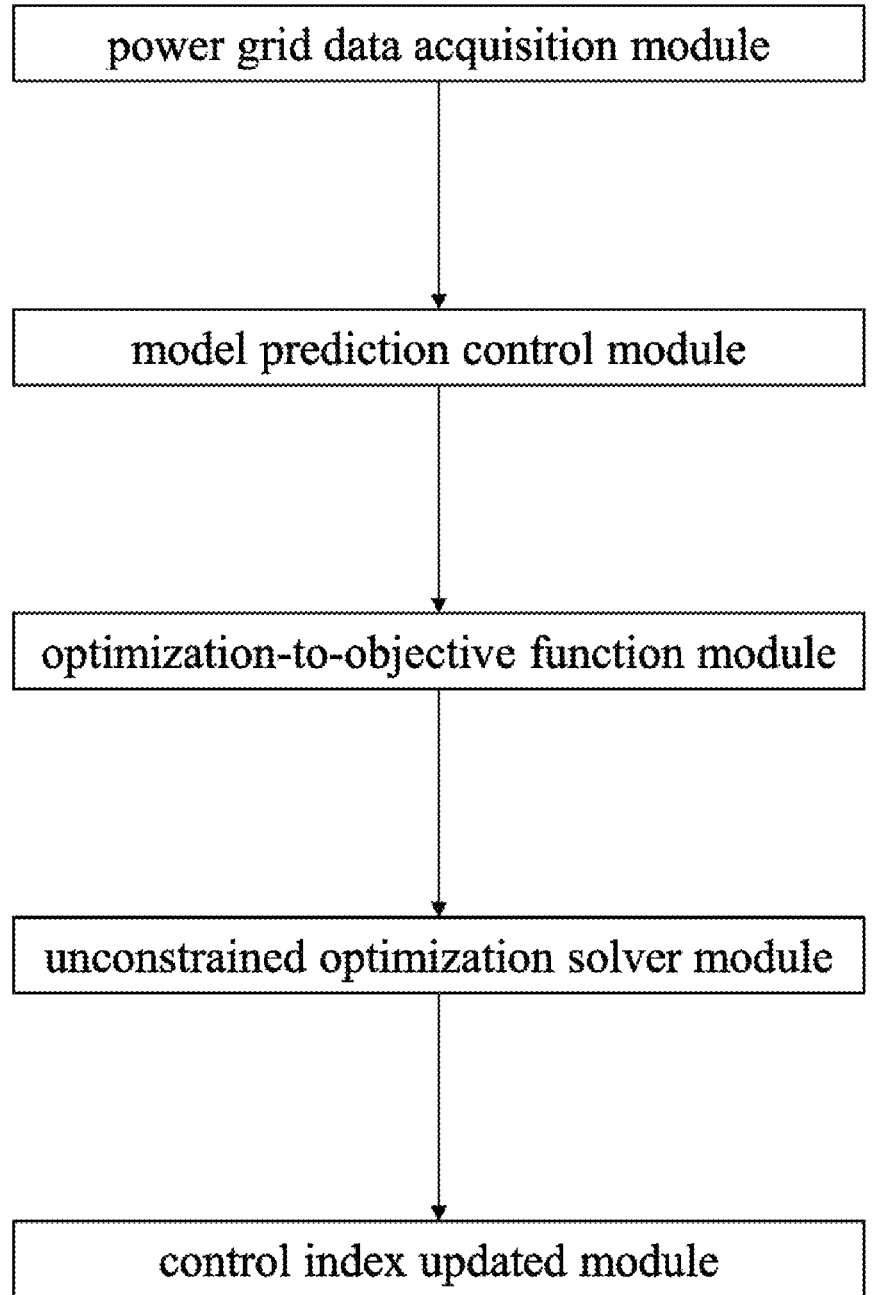
FIG. 5 is an overall flow chart of a model prediction-based control system for grid forming of a multi-port autonomous reconfigurable solar plant provided by a second embodiment of the present invention.

Referring to FIG. 5, which is an embodiment of the present invention, providing a model prediction-based control system for grid forming of a multi-port autonomous reconfigurable solar plant, which includes:

a power grid data acquisition module, a model prediction control module, an optimization-to-objective function module, and an unconstrained optimization solver module, and a control index updated module.

The power grid data acquisition module is used to collect the voltage and current data information of the power grid in real time.

The model prediction control module uses the data obtained from the power grid data acquisition module to perform prediction through the dynamic model of the synchronous generator, so as to calculate the voltage, current and rotor angle at the next time.

The optimization-to-objective function module is used to establish the optimization objective function for system control, including the difference between motor torque and mechanical torque and the deviation of angular frequency relative to the reference angular frequency.

The unconstrained optimization solver module uses the Newton method optimization algorithm, according to the optimization objective function, to convert the optimization problem into an unconstrained optimization problem, and solves the optimal angular frequency.

The control index updated module updates the output voltage of the MARS system and the dq-axis current, according to the optimal angular frequency obtained by the unconstrained optimization solver module, and changes the arm modulation index of the system, and realizes the plant's inertia and primary frequency modulation support.

Embodiment 3

An embodiment of the present invention is different from the previous two embodiments in that:

If the functions are implemented in the form of software functional units and sold or used as independent products, they can be stored in a computer-readable storage medium. Based on this understanding, the technical solution of the present invention essentially or the part that contributes to the existing technology or the part of the technical solution can be embodied in the form of a software product. The computer software product is stored in a storage medium, including several instructions configured to cause a computer device (which may be a personal computer, a server, or a network device, etc.) to execute all or part of the steps of the methods described in various embodiments of the present invention. The aforementioned storage media include: US ash drive, mobile hard disk, ROM (Read-Only Memory), RAM (Random Access Memory), magnetic disk, or optical disk, which serves as media that can store program code.

The logic and/or steps represented in the flowcharts or otherwise described herein, for example, may be considered a sequenced list of executable instructions for implementing the logical functions, and may be embodied in any computer-readable medium for individually using with or in combination with instruction execution systems, devices or apparatuses (such as computer-based systems, systems including processors or other systems that can fetch instructions from and execute instructions from an instruction execution system, device or apparatus). For the purposes of the present specification, a "computer-readable medium" may be any device that can contain, store, communicate, propagate, or transport a program for use by or in connection with an instruction execution system, apparatus, or device.

More specific examples (non-exhaustive list) of computer readable media include elements as follows: electrical connections with one or more wires (electronic device), portable computer disk cartridges (magnetic device), random access memory (RAM), Read-only memory (ROM), erasable and programmable read-only memory (EPROM or flash memory), fiber optic devices, and portable compact disc read-only memory (CDROM). Furthermore, the computer-readable medium may even be paper or other suitable medium on which the program may be printed. The program may be obtained electronically, for example by optical scanning of paper or other media followed by editing, interpretation or other suitable processing if necessary, and then stored in a computer memory.

It should be understood that various parts of the present invention may be implemented in hardware, software, firmware, or a combination thereof. In the above embodiments, multiple steps or methods may be implemented using software or firmware stored in a memory and executed by a suitable instruction execution system. For example, if it is implemented in hardware, as in another embodiment, it can be implemented by any one or a combination of the following technologies known in the art: discrete logic circuits with logic gates for implementing logical functions on data signals, application specific integrated circuits with suitable combinational logic gates, programmable gate arrays (PGA), field programmable gate arrays (FPGA), etc.

Embodiment 4

Figure 6:
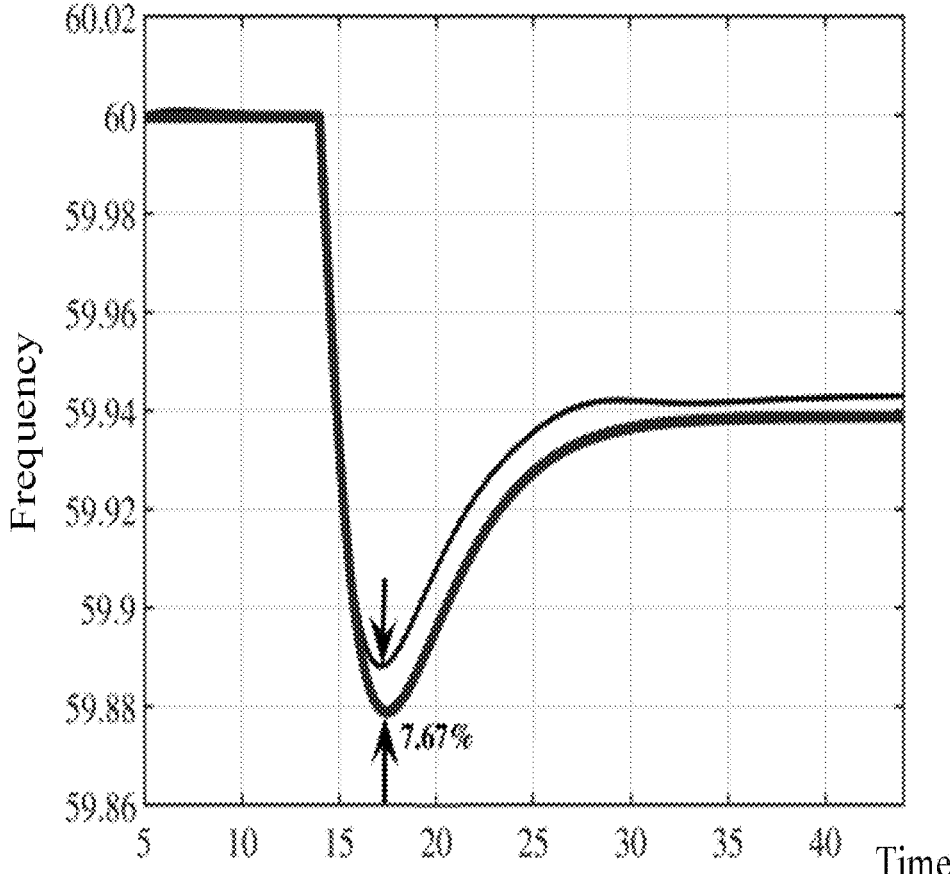
FIG. 6 shows system frequency response results of a model prediction-based control method for grid forming of a multi-port autonomous reconfigurable solar plant provided by a fourth embodiment of the present invention.
Figure 7:
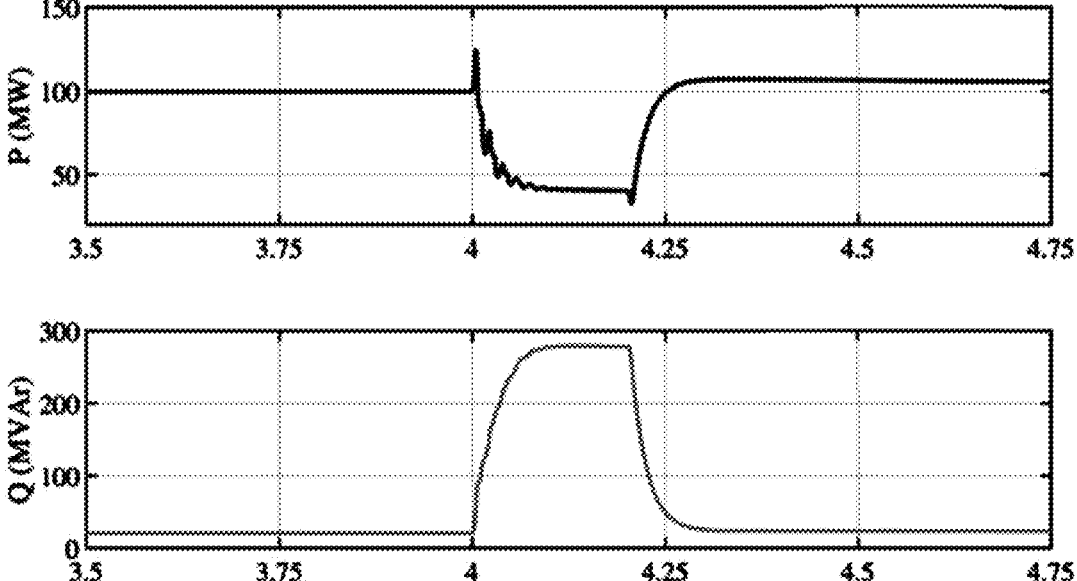
FIG. 7 is a comparison chart of active power and reactive power provided during a MARS system failure with respect to a model prediction-based control method for grid forming of a multi-port autonomous reconfigurable solar plant provided by a fourth embodiment of the present invention.

Referring to FIGS. 6-7, an embodiment of the present invention provides a model prediction-based control method for the grid forming of the multi-port autonomous reconfigurable solar plants, in order to evaluate the performance of the proposed method, the MARS system is connected to the AC system to establish a simulation model, in which the AC system is replaced by a synchronous machine.

Different short circuit ratios (SCR) are simulated by changing the length of the AC system transmission line, and different inertias are simulated by changing the inertia parameter settings of the synchronous machine. In this regard, the MARS system and synchronous machine parameters are shown in Table 1.

TABLE 1

| MARS system and synchronous machine parameter list | | | |
|---|---|---|---|
| parameters | values | parameters | values |
| MARS system | | capacitance of module | 7.7 |
| System rated power | 400 MW | Synchronous generator | |
| DC bus voltage Vdc | ±200 kV | Generator rated power | 750 MW |
| AC side voltage Vac | 220 kV | Generator terminal voltage | 20 kV |
| Photovoltaic system rated power Pess | 100 MW | xd, xd', xd" | 1.8, 0.3, 0.25 |
| Energy storage system rated power Pess | 32.8 MW | xq, xq", xl | 1.7, 0.55, 0.2 |
| Normal number of modules/arm (Nnorm) | 102 | td', td", tq', tq" | 8, 0.03, 0.4, 0.5 |
| Number of photovoltaic modules/arm (Npv) | 111 | Stator resistance per unit value | 0.0025 |
| Number of energy storage modules/arm (Ness) | 37 | Speed governor adjustment coefficient per unit value | 0.05 |
| Bridge arm inductor L0 | 30.0 mH | Excitation system gain | 200 |
| Bridge arm resistor R0 | 0.1 Ω | Excitation system time constant/s | 0.001 |
| Grid side inductance Ls | 40.0 mH | AC line resistance/W · m−1 | 5.29e−3 |
| Grid side resistance Rs | 0.8333 Ω | AC line inductance/H · m−1 | 1.4e−5 |
| Module capacitor voltage | 1.6 kV | Transformer ratio and wiring method | 220/20, Yd11 |

Sudden load increasing: the AC power grid load is suddenly increased by 30 MW in 14 seconds. The MBPC method proposed in the present disclosure is compared with no additional control and traditional grid following mode of control (GFL). FIG. 6 shows the system frequency response results when the short circuit ratio SCR=0.5 and the system inertia H=6 using MBPC control and without any additional control. The MBPC method increases the lowest point of frequency deviation by 7.67%. As the system inertia H=6, various control results under different short-circuit ratios are shown in Table 2. When SCR=0.5, the GFL scheme cannot be stable, which is caused by inaccurate tracking of the phase-locked loop voltage angle; in a weak gird state, the MBPC solution with networking capabilities provides better frequency support than traditional networking solutions in terms of frequency minimum point and steady state.

TABLE 2

Comparison table of various control results under different short circuit ratios

| | MBPC | | GFL | |
| --- | --- | --- | --- | --- |
| SCR | Lowest frequency point | Stable frequency value | Lowest frequency point | Stable frequency value |
| 0.5 | 8.29% | 6.04% | Unstable | |
| 2 | 13.96% | 9.10% | 10.32% | 5.9% |
| 4 | 14.19% | 9.19% | 10.86% | 5.99% |
| 10 | 14.53% | 9.73% | 16.87% | 17.34% |

Three-phase ground fault: it is to simulate a three-phase short-circuit fault on the MARS system and the AC power grid transmission line at 4s, and the fault duration is 0.2 seconds. FIG. 7 shows the active and reactive power provided during MARS system failure at a condition that the short circuit ratio SCR=0.5 and the system inertia H=6 with the MBPC control adopted. It can be seen that the MARS system can operate sustainably during faults and operate in a stable mode under post-fault conditions, while the MARS system under GFL control cannot provide stable support under fault conditions.

It should be noted that the above embodiments are provided for the purpose of illustrating the technical solution of the present invention and should not be considered as limiting. Although reference has been made to preferred embodiments for a detailed description of the present invention, those skilled in the art should understand that modifications or equivalent replacements can be made to the technical solution of the present invention without departing from the spirit and scope of the invention, all of which are encompassed within the scope of the claims of the present invention.

What is claimed is:

1. A model prediction-based control method for grid forming of multi-port autonomous reconfigurable solar plant (MARS), comprising:
   estimating and predicting system parameters by establishing the MARS and a dynamic model of a synchronous generator model;
   converting an objective function into an unconstrained optimization problem, using Newton's method to achieve minimum computational burden within each calculation time step to find a solution in real time for obtaining an optimal angular frequency;
   updating, based on results of the optimal angular frequency, an output voltage and a dq-axis current of the MARS, and changing an arm modulation index of the plant, thereby realizing the plant's inertia and primary frequency modulation support;
   wherein the estimating and predicting the system parameters comprises measuring voltage and current data at a first time step [k] of an interconnection point between a MARS system and a transmission grid;
   according to a dynamic continuous time model of the MARS system, estimating the voltage and current data at a subsequent time step [k+1];
   setting an optimal angular frequency ($\omega_{sg}$) at the subsequent time step [k+1] to the value of the previous step, and, according to a synchronous generator frequency dynamic model and the voltage and current data at the subsequent time step [k+1], estimating a rotor angle ($\theta_{sg}$) to obtain an electromechanical torque at a next successive time step [k+2];
   establishing quadratic term deviation of the [k+2] electromechanical torque relative to a mechanical torque and an optimization objective function of deviation of a [k+1] angular frequency relative to a reference angular frequency.

2. The model prediction-based control method for grid forming of multi-port autonomous reconfigurable solar plant according to claim 1, wherein the MARS system is a three-phase system with each phase composed of two arms, and each arm is composed of a normal module, a photovoltaic module, an energy storage module, an arm inductor ($L_o$), and an arm resistance ($R_o$), in which each arm comprises at least one normal module, one photovoltaic module, and one energy storage module, respectively.

3. The model prediction-based control method for grid forming of multi-port autonomous reconfigurable solar plant according to claim 2, wherein the dynamic continuous time model is expressed as, $$\begin{cases} \left(L_s + \dfrac{L_o}{2}\right)\dfrac{di_j}{dt} + \left(R_s + \dfrac{R_o}{2}\right)i_j = e_j - v_j \\ e_i = \dfrac{-v_{p,j} + v_{n,j}}{2} \end{cases}$$

$$T_e[k+2] = M_f i_f[k]\left(i_a[k+2]\cos(\theta_{sg}[k+2]) + \right.$$
$$\left. i_b[k+2]\cos(\theta_{sg}[k+2] - 2\pi/3) + i_c[k+2]\cos(\theta_{sg}[k+2] - 4\pi/3)\right)$$

$$e_a[k+1] = \omega_{sg}[k+1]M_f i_f[k]\cos(\theta_{sg}[k+1])$$

$$e_b[k+1] = \omega_{sg}[k+1]M_f i_f[k]\cos(\theta_{sg}[k+1] - 2\pi/3)$$

$$e_c[k+1] = \omega_{sg}[k+1]M_f i_f[k]\cos(\theta_{sg}[k+1] - 4\pi/3)$$

$$Q[k] = -\omega_{sg}[k]M_f i_f[k]\left(i_a[k]\sin(\theta_{sg}[k]) + \right.$$
$$\left. i_b[k]\sin(\theta_{sg}[k] - 2\pi/3) + i_c[k]\sin(\theta_{sg}[k] - 4\pi/3)\right)$$

$$\theta_{sg}[k+2] = \theta_{sg}[k+1] + h\omega_{sg}[k+1]$$

$$\omega_{sg}[k+2] =$$

$$\omega_{sg}[k+1]\left(1 - \frac{hD_p}{J}\right) + \frac{h}{J}(T_m[k+1] - T_e[k+1] - D_p(\omega_n[k+1]))$$

where, $i_j$ and $v_j$ are grid current and voltage of the j-th phase (j∈a, b, c) respectively, $e_j$ represents an output voltage of the j-th phase of the MARS system, $L_o$ and $R_o$ are arm inductance and arm resistance, respectively, $L_s$, $R_s$ are grid-side inductance and grid-side resistance, respectively, $M_{fif}$ is an excitation current of the synchronous generator, $T_e$ represents an electromechanical torque, $\theta_{sg}$ represents a rotor angle, Q represents a reactive power, $\omega_{sg}$ represents an optimal angular frequency, h represents an integration step, and k represents current time, $D_p$ represents a damping coefficient, J represents a moment of inertia, and $T_m$ represents a mechanical torque.

4. The model prediction-based control method for grid forming of multi-port autonomous reconfigurable solar plant according to claim 3, the objective function is expressed as, $$J(x) = J_1(x) + J_2(x)$$

$$x = (\omega_{sg}[k+1])$$

$$J_1(x) = \lambda_1 (T_e[k+2] - T_m[k+2])^2$$

$$J_2(x) = \lambda_2 (\omega_n[k+1] - x)^2$$

where, $\lambda_1$ and $\lambda_2$ represent weights of cost functions, and On represents a reference angular frequency.

5. The model prediction-based control method for grid forming of multi-port autonomous reconfigurable solar plant according to claim 4, wherein a result of the optimal angular frequency is expressed as, $$\min_x J(x)$$

$$\text{s.t. } T_e[k+2] = M_f i_f[k] (i_a[k+2]\cos(\theta_{sg}[k+2]) +$$

$$i_b[k+2]\cos(\theta_{sg}[k+2] - 2\pi/3) + i_c[k+2]\cos(\theta_{sg}[k+2] - 4\pi/3))$$

$$e_a[k+1] = \omega_{sg}[k+1]M_f i_f[k]\cos(\theta_{sg}[k+1])$$

$$e_b[k+1] = \omega_{sg}[k+1]M_f i_f[k]\cos(\theta_{sg}[k+1] - 2\pi/3)$$

$$e_c[k+1] = \omega_{sg}[k+1]M_f i_f[k]\cos(\theta_{sg}[k+1] - 4\pi/3)$$

$$\theta_{sg}[k+2] = \theta_{sg}[k+1] + h\omega_{sg}[k+1]$$

$$T_m[k+2] = \frac{P_{ac,ref}[k+2]}{\omega_n}$$

where, $P_{ac,ref}$ represents an AC side power scheduling command.

6. The model prediction-based control method for grid forming of multi-port autonomous reconfigurable solar plant according to claim 5, wherein the result for the optimal angular frequency comprises substituting equation terms into J(x), and the objective function J(x) is transformed into an unconstrained optimization problem, wherein the transformed objective function is minimized using Newton's method, and x at each time step is given by calculating (n+1) iterations by using a recursive formula;

wherein the recursive formula is expressed as, $$x^{(n+1)} = x^{(n)} - F(x^{(n)})^{-1}g(x^{(n)})$$

$$g(x^{(n)}) = \left[\frac{\partial J(x^{(n)})}{\partial x}\right]$$

-continued $$F(x^{(n)}) = \left[\frac{\partial g(x^{(n)})}{-\partial x}\right]$$

where, $x^{(n+1)}$ is the optimal angular frequency $\omega_{sg}$ after the (n+1)-th iteration, $g(x^{(n)})$ is derivative of the objective function J(x), and F $(x^{(n)})$ is derivative of function $g(x^{(n)})$;

where the realizing the plant's inertia and primary frequency modulation support comprises updating the output voltage of the MARS system and the dq-axis current according to the results of the optimal [k+1] angular frequency, changing the arm modulation index of the system, and realizing the plant's inertia and primary frequency modulation support.

7. A system applying a model prediction-based control method for grid forming of multi-port autonomous reconfigurable solar plant (MARS) according to claim 1, comprising:

a power grid data acquisition module, a model prediction control module, an optimization-to-objective function module, and an unconstrained optimization solver module, and a control index updated module;

wherein the power grid data acquisition module is used to collect voltage and current data information of a power grid in real time;

wherein the model prediction control module uses the data obtained from the power grid data acquisition module to perform prediction through a dynamic model of a synchronous generator, so as to calculate the voltage, current and rotor angle at the next time;

wherein the optimization-to-objective function module is used to establish the optimization objective function for system control, comprising a difference between motor torque and mechanical torque and deviation of angular frequency relative to a reference angular frequency;

wherein the unconstrained optimization solver module uses a Newton method optimization algorithm, according to the optimization objective function, to convert the optimization problem into an unconstrained optimization problem, and solves the optimal angular frequency;

wherein the control index updated module updates the output voltage of the MARS system and the dq-axis current, according to the optimal angular frequency obtained by the unconstrained optimization solver module, and changes the arm modulation index of the system, and realizes the plant's inertia and primary frequency modulation support.

8. A computer device comprising a memory and a processor, wherein the memory stores a computer program, and, when the processor executes the computer program, the method of claim 1 is implemented.

9. A non-transitory computer-readable storage medium has a computer program stored thereon, wherein, when the computer program is executed by a processor, the method of claim 1 is implemented.

* * * * *